(12) United States Patent
Ooyama et al.

(10) Patent No.: US 6,617,722 B2
(45) Date of Patent: Sep. 9, 2003

(54) MAGNETIC LEVITATION ROTATING MACHINE

(75) Inventors: Atsushi Ooyama, Fujisawa (JP); Toshiharu Nakazawa, Chigasaki (JP); Matsutaro Miyamoto, Chigasaki (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/950,054

(22) Filed: Sep. 12, 2001

(65) Prior Publication Data

US 2002/0036435 A1 Mar. 28, 2002

(30) Foreign Application Priority Data

Sep. 13, 2000 (JP) ......................................... 2000-278815

(51) Int. Cl.[7] .............................. H02K 29/14; G01P 3/42
(52) U.S. Cl. ................................ 310/68 B; 324/207.25; 310/90.5
(58) Field of Search ........................... 310/68 B, 67 R, 310/90.5; 324/207.15; 74/514.31

(56) References Cited

U.S. PATENT DOCUMENTS 2,968,756 A * 1/1961 Devol .......................... 318/254
4,024,446 A * 5/1977 Burnett ........................ 318/685
4,289,983 A * 9/1981 Bengnar et al. ........... 310/49 R
4,406,272 A * 9/1983 Kiess et al. .................. 123/617
4,523,896 A 6/1985 Lhenry et al. ............... 417/244
5,463,263 A * 10/1995 Flynn .......................... 310/181

FOREIGN PATENT DOCUMENTS

| JP | 02287263 | 11/1990 |
| JP | 09-009569 | 1/1997 |
| JP | 2000205259 | 7/2000 |

* cited by examiner

Primary Examiner—Burton Mullins
(74) Attorney, Agent, or Firm—Armstrong, Westerman & Hattori, LLP (57) ABSTRACT

A magnetic levitation rotating machine is provided which can stably detect the displacement and rotating speed of a rotator and, at the same time, can reduce the size of the whole apparatus, that is, can render the whole apparatus compact. The magnetic levitation rotating machine for supporting a rotator in a levitated state by magnetic force of an electromagnet or a permanent magnet comprises: a position detection plane provided in the rotator and a concave and/or a convex provided in the plane; a displacement sensor provided on the fixed side, for detecting the displacement of the plane including the concave or the convex; and a detection mechanism for detecting the displacement of the rotator and the rotating speed of the rotator from the output of the displacement sensor.

9 Claims, 7 Drawing Sheets

MAGNETIC LEVITATION ROTATING MACHINE

BACKGROUND OF THE INVENTION

1. Field of the Invention

The present invention relates to a magnetic levitation rotating machine which performs levitation support control of a rotator, provided with a magnetic material as an object to be controlled, so that the rotator is supported in a levitated state at a desired position in a noncontact manner through the utilization of magnetic attraction force or magnetic repulsion force generated by an electromagnet or a permanent magnet. More particularly, the present invention relates to a detection mechanism for detecting the axial displacement and the rotating speed of the rotator.

2. Description of the Related Art

Figure 10:
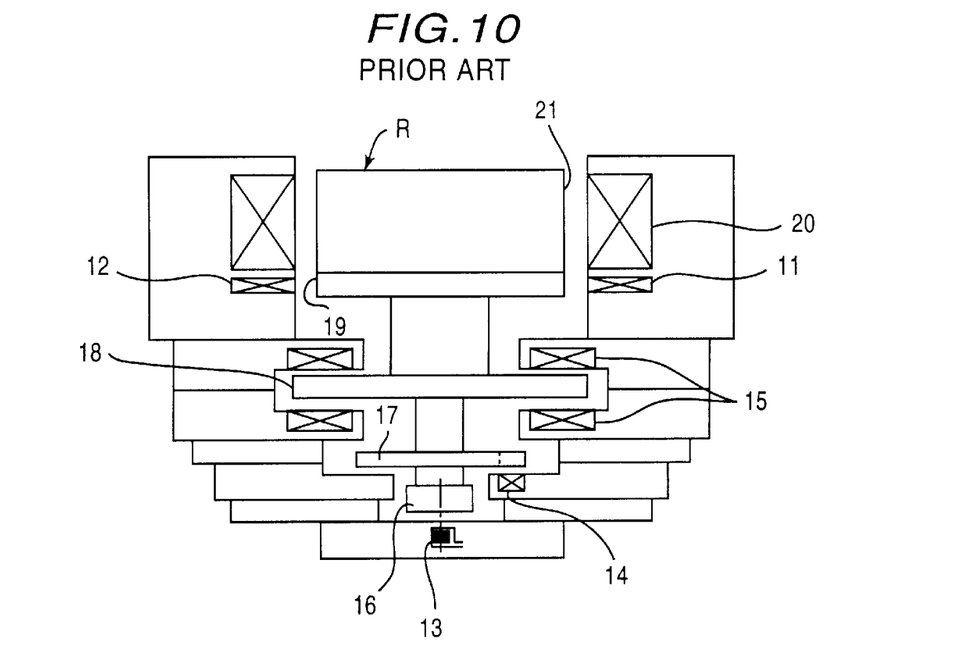
FIG. 10 is a cross-sectional view of a conventional magnetic bearing mechanism.
Figure 11:
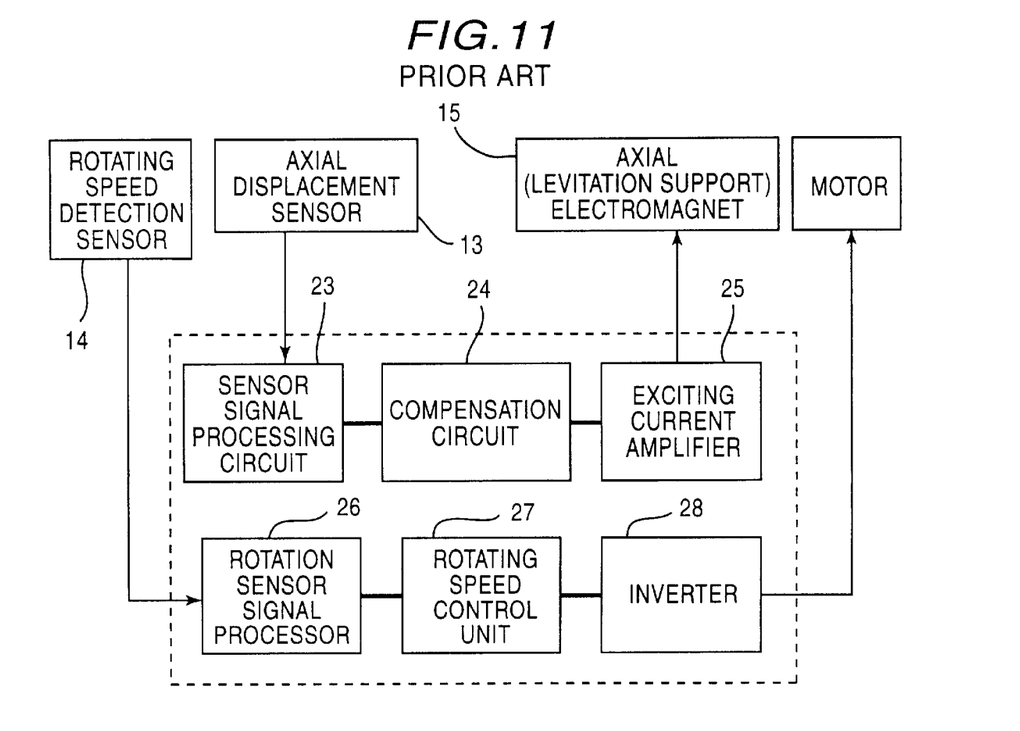
FIG. 11 is a block diagram of a control unit for axial displacement and rotating speed in the magnetic bearing mechanism in FIG. 10.

FIG. 10 is a diagram showing a general example of the construction of a conventional magnetic bearing mechanism, and FIG. 11 is a diagram showing an example of the construction of a control unit for performing levitation support control of the magnetic bearing. In the magnetic levitation rotating machine, a rotator R is driven and rotated by a motor in a noncontact manner, and, in addition, is supported in a levitated state by a radial magnetic bearing and a thrust magnetic bearing. The rotator R is provided with a target member 21 of a magnetic material, and is supported in a levitated state at a radial target levitation position by controlling magnetic attraction force generated from a radial support electromagnet 20. A radial displacement sensor 11 is provided near the electromagnet 20. The radial displacement sensor 11 measures the radial displacement (location) of a target magnetic material 19 provided in the rotator R. Further, the rotator R is provided with a thrust disk 18 formed of a magnetic material, and an axial levitation support electromagnet 15 for the rotator R is disposed so as to sandwich the thrust disk 18 thereby. The rotator R provided with the thrust disk 18 is supported in the levitated state at an axial target levitation position by controlling magnetic attraction force generated from the axial levitation support electromagnet 15.

A target 16, formed of a magnetic material, for a position sensor is provided at the shaft end of the rotator R, and an axial displacement sensor 13 for the rotator R is provided on the fixed side to measure the axial displacement of the rotator R. The rotator R is provided with a rotating speed detection disk 17, and a rotating speed detection sensor 14 is provided on the fixed side in its position near the rotating speed detection disk 17. Here all the displacement sensors 11, 12, 13 are sensors utilizing such a phenomenon that magnetic characteristics are changed in response to the displacement of a target (magnetic) material, such as an eddy current sensor or an inductance sensor. The rotating speed detection disk 17 has a concave or a convex, and passage through the concave or the convex is detected by a displacement sensor utilizing the same magnetic properties as described above to detect the rotating speed. In the example of the construction of the conventional magnetic bearing mechanism shown in FIG. 10, two sensors 11, 12 for detecting the radial displacement are shown. In fact, however, two additional sensors are disposed in a direction perpendicular to the paper surface. The sensors can detect a coordinate position within a plane perpendicular to the rotating shaft of the rotator.

In the prior art, as shown in FIG. 11, the axial displacement sensor 13, the rotating speed detection sensor 14, and the axial levitation support electromagnet 15 are disposed in a hierarchical structure manner on the fixed side of the magnetic bearing mechanism along the axial direction of the rotator R. As shown in FIG. 11, a signal, on the axial position (displacement) of the rotator R, obtained by the axial displacement sensor 13 is sent through a sensor signal processor 23 and a compensation circuit 24 provided within the control unit to an exciting current output amplifier 25 that outputs exciting current which is then supplied to the axial levitation support electromagnet 15 to perform excitation, whereby the rotator R is controlled so as to be levitated and supported at an axial predetermined position. Likewise, the output of the rotating speed detection sensor 14 is input into a rotation sensor signal processor 26, provided within the control unit, where the rotating speed is computed. The rotating speed value thus obtained is compared with a target rotating speed in a rotating speed controlling unit 27, and a current for driving the motor is supplied from an inverter 28 to the motor (not shown in FIG. 10) so that the rotating speed is brought to a predetermined value.

A great feature of the magnetic levitation rotating machine, wherein a rotator is supported in a levitated state by the above-described series of magnetic levitation controls, is such that the rotator, even when located at any position, is supported in a levitated state and rotated in a noncontact manner. Therefore, a noncontact rotating speed detection system should also be used in rotating speed detection means at the time of the application of rotating force by an induction machine or a synchronous machine.

Specifically, in addition to a displacement sensor element for levitation position detection for performing levitation support control of the rotator, a rotating speed detection sensor element should be installed. In the conventional techniques, however, as with the displacement sensor for position detection for magnetic levitation control, rotating speed detection sensors of an eddy current type, induction type, or inductance type, which is an electromagnetic detection method, have been generally used. When the electromagnetic sensor of the conventional type is used, however, for some mechanical arrangement of the sensors, a mutual electromagnetic interference phenomenon occurs. Therefore, the rotating speed detection sensor element and the displacement sensor element for position detection should be provided while leaving a space therebetween.

That is, in order to operate the above structure without any electromagnetic trouble, in FIG. 10, a certain space should be provided between the axial displacement sensor 13 and the rotating speed detection sensor 14 and between the rotating speed detection sensor 14 and the axial levitation support electromagnet 15. Therefore, there is a limitation on a reduction in size of the shaft end portion in the magnetic bearing mechanism.

Further, in the conventional system, as shown in FIG. 10, in the detection of the rotating speed, a method has been used wherein a rotating speed detection disk 17 partially provided with a notch is provided at the shaft end of the rotator and the disk is rotated together with the rotator and, in this case, when the notch has passed the front of the rotating speed detection sensor, a pulse signal synchronized with the rotating speed is generated. In this method, however, leaked magnetic flux of the magnetic levitation electromagnet is introduced into a portion around the rotating speed detection disk 17, and this deteriorates the S/N ratio of the rotating speed detection sensor signal. For this reason, the disposition of the rotating speed detection disk 17, the axial displacement sensor target 16, and the thrust disk 18 while leaving a certain space among one another is unavoidably necessary from the viewpoint of structure.

As described above, due to the above-described restrictions, the noncontact-type rotating speed detection sensor, based on an electromagnetic principle, which is provided within the magnetic bearing mechanism for levitating and supporting the rotator, should be provided while leaving a certain space, for example, from the electromagnet and the displacement sensor for position detection constituting the magnetic bearing mechanism. This is an obstacle to a reduction in size of the whole magnetic bearing mechanism.

In the rotating speed detection system of the rotating speed detection sensor, the adoption of a system utilizing an optical or other semiconductor sensor, which is not electromagnetic means, is considered effective for avoiding some of the above restrictions. Semiconductor sensors, however, are not suitable for applications of magnetic levitation rotating machines because they have problems including that semiconductor sensors are expensive and thus increase the cost, have low heat resistance, and suffer from complicate incorporated structure.

SUMMARY OF THE INVENTION

The present invention has been made under the above circumstances, and it is an object of the present invention to provide a magnetic levitation rotating machine which can realize stable displacement detection and rotating speed detection of the rotator and, in addition, can reduce the size of the whole system, that is, can render the whole system compact.

According to one aspect of the present invention, there is provided a magnetic levitation rotating machine for supporting a rotator in a levitated state by magnetic force of an electromagnet or a permanent magnet, the magnetic levitation rotating machine comprising: a position detection plane provided in the rotator and a concave and/or a convex provided in the plane; a displacement sensor provided on the fixed side, for detecting the position displacement of the plane including the concave or the convex; and a detection mechanism for detecting the displacement of the rotator and the rotating speed of the rotator from the output of the displacement sensor.

According to this construction, the detection of the displacement of the rotator and the detection of the rotating speed can be carried out using a single target member. Therefore, the structure of the magnetic bearing is simplified, and the size of this site can be reduced. In addition, the number of necessary components is reduced, leading to a reduction in cost.

Preferably, the displacement of the rotator is detected by extracting, from the output of the displacement sensor, the output of the displacement of the plane with the component representing the concave or the convex being removed therefrom.

Preferably, the rotating speed of the rotator is detected by extracting, from the output of the displacement sensor, pulse output corresponding to the concave or the convex.

In the magnetic levitation rotating machine, preferably, at least one pair of the displacement sensors is disposed at an arbitrary angle to the center of rotation of the rotator, the detection plane is disposed so as to face the displacement sensors, the concave and the convex are disposed so as to correspond to the positions of the displacement sensors at the same angle as the arbitrary angle, at which the displacement sensors are disposed, to the center of rotation of the plane, and the position displacement and rotating speed of the detection plane are computed from the outputs of the at least one pair of the displacement sensors and are output to enable the detection of both the displacement of the rotator and the rotating speed of the rotator.

The provision of the concave and the convex in the detection plane permits the axial displacement and the rotating speed of the rotator to be detected separately from each other without mutual interference.

Preferably, the detection plane is disposed in a thrust disk of a magnetic material which is an object to be controlled by an electromagnet for axial position control. This construction can eliminate the need to provide a disk fixed to the rotator for detecting the rotating speed and thus can shorten the length of the whole machine and can reduce the size of the whole machine.

In summary, according to the present invention, the rotating speed detection sensor, which has hitherto been an obstacle to a reduction in size, can be simplified. Therefore, the size of the magnetic bearing mechanism can be reduced and the cost can be reduced by virtue of the reduced number of components necessary for constituting the magnetic bearing mechanism.

The above and other objects, features, and advantages of the present invention will be apparent from the following description when taken in conjunction with the accompanying drawings which illustrates preferred embodiments of the present invention by way of example.

DETAILED DESCRIPTION OF THE PREFERRED EMBODIMENTS

Preferred embodiments of the magnetic levitation rotating machine according to the present invention will be explained with reference to the accompanying drawings.

Figure 1:
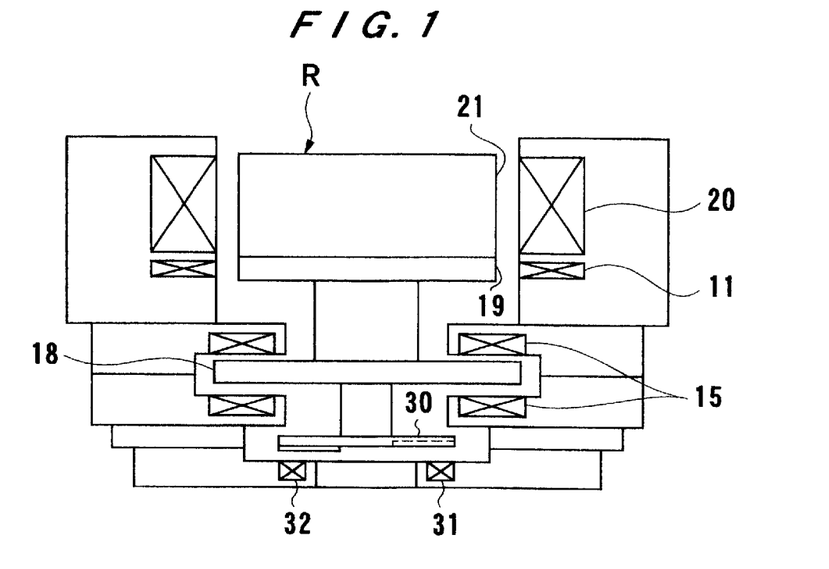
FIG. 1 is a cross-sectional view of a magnetic bearing mechanism according to the first embodiment of the present invention.
Figure 2A:
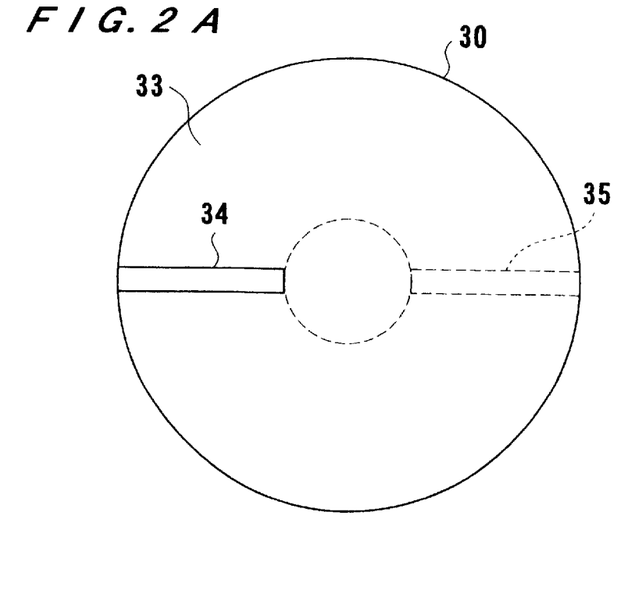
FIGS. 2A, 2B, and 2C are respectively a plan view, an elevational view, and a side view of a detection disk in FIG. 1.
Figure 2B:
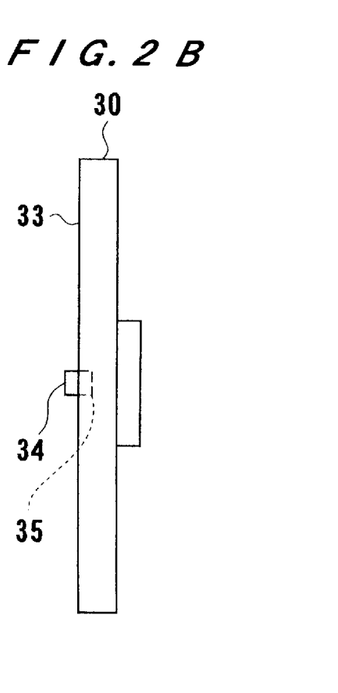
Figure 2C:
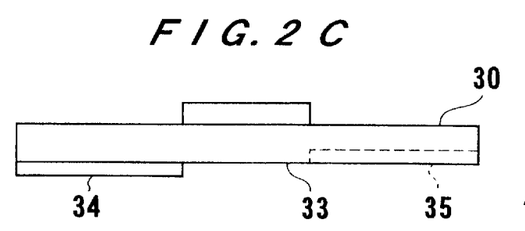
Figure 3:
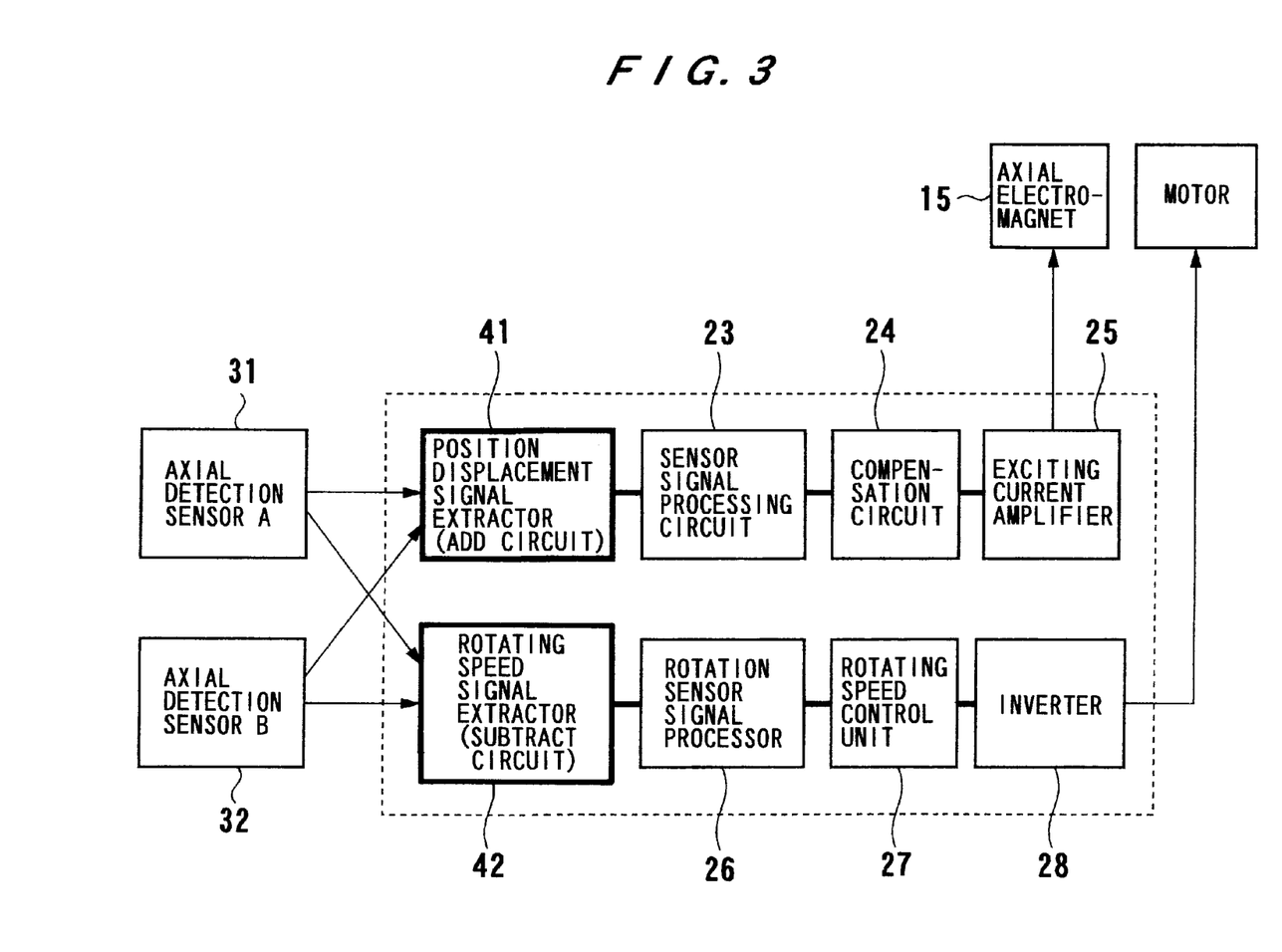
FIG. 3 is a block diagram of a control unit for axial displacement and rotating speed in the magnetic bearing mechanism in FIG. 1.

FIG. 1 is a diagram showing the structure of a shaft end of the magnetic bearing mechanism according to the first embodiment of the present invention, FIG. 2 a diagram showing the construction of a detection disk, and FIG. 3 a block diagram showing the construction of a control unit.

According to this embodiment, a displacement detection-rotating speed detection disk 30 is provided at the shaft end of a rotator R to detect the axial displacement and rotating speed of the rotator R. Axial detection displacement sensors 31, 32 are disposed on the fixed side of the magnetic bearing mechanism so as to face this detection disk 30. In the displacement detection-rotating speed detection disk 30 provided at the shaft end of the rotator R, as shown in FIG. 2, a flat detection plane 33 is provided, and a convex 34 and a concave 35 are disposed on the detection plane radially symmetrically with respect to the center of the disk. Likewise, axial detection displacement sensors 31, 32 are provided on the fixed side at respective positions that are radially symmetrical with respect to the center of the shaft. The other construction is the same as that of the prior art shown in FIG. 10. That is, a radial support electromagnet 20, a radial position detection displacement sensor 11, and an axial support electromagnet 15 are provided on the fixed side, and target members 21, 19 formed of a magnetic material and a thrust disk 18 are provided on the rotator side.

FIG. 3 is a block diagram showing a control unit in the magnetic levitation rotating machine. The signal output from the axial detection displacement sensor 31 and the signal output from the axial detection displacement sensor 32 each are input into a position displacement signal extractor 41 and a rotating speed signal extractor 42. Here the position displacement signal extractor 41 is an add circuit, and the rotating speed signal extractor 42 is a subtract circuit. The signal outputs from the axial detection displacement sensors 31, 32 are added in the position displacement signal extractor 41, and are subtracted in the rotating speed signal extractor 42.

Figure 4A:
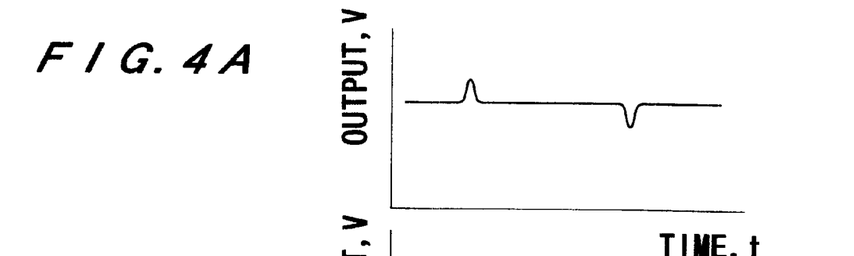
FIGS. 4A and 4B each are a diagram showing a displacement sensor output signal.
Figure 4B:
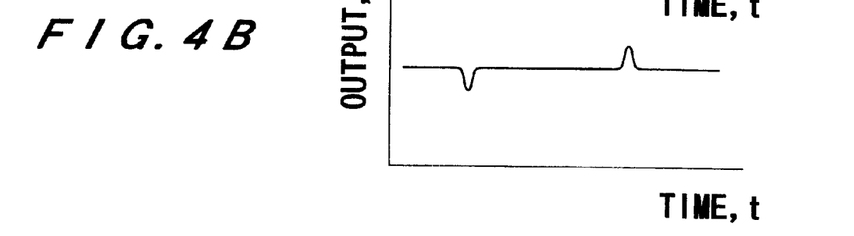

The signal is divided by the position displacement signal extractor 41 and the rotating speed signal extractor 42 within the control unit shown in FIG. 3 into a rotating speed detection signal and a position displacement detection signal. When the rotator R is being rotated in a levitated state at a certain position in the axial direction, as shown in FIGS. 4A and 4B, the signals detected by the axial displacement sensors 31, 32 are pulse signals that are opposite to each other in phase on the time-axis and indicate the width in the circumferential direction and the depth in the thickness-wise direction of the concave and convex 34, 35 provided in the detection disk 30. For the DC (direct current) component of each signal, a signal indicating the spacing (gap length) between the flat detection plane 33 and the axial detection displacement sensor is output.

Figure 4C:
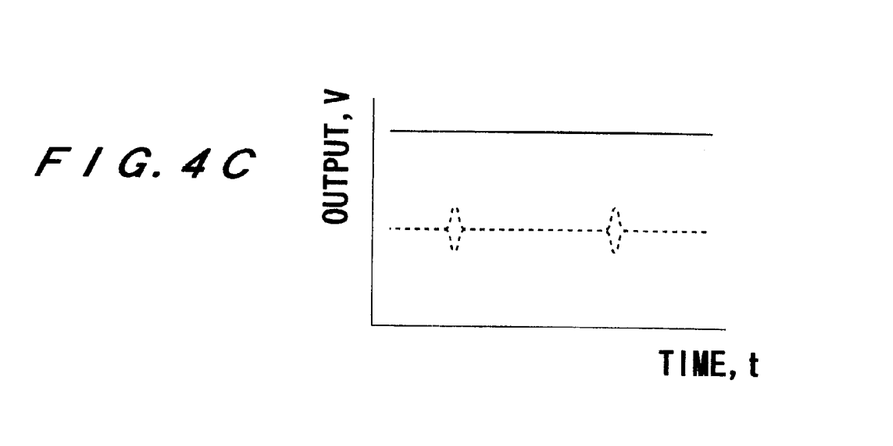
FIG. 4C a diagram showing an add signal output of two displacement sensors.

In the interior of the control unit shown in FIG. 3, the signals output from the axial detection displacement sensors 31, 32 are input respectively into the position displacement signal extractor 41 as the add circuit and the rotating speed signal extractor 42 as the subtract circuit. In the position displacement signal extractor 41, as shown in FIG. 4C, both the outputs of the sensors 31, 32 are added, and this offsets pulse signals, corresponding to the concave and the convex shown in FIGS. 4A and 4B, against each other. Therefore, a signal corresponding to the distance (displacement) of the plane 33 of the detection disk 30 from the displacement sensors 31, 32 is output from the position displacement signal extractor 41.

Figure 4D:
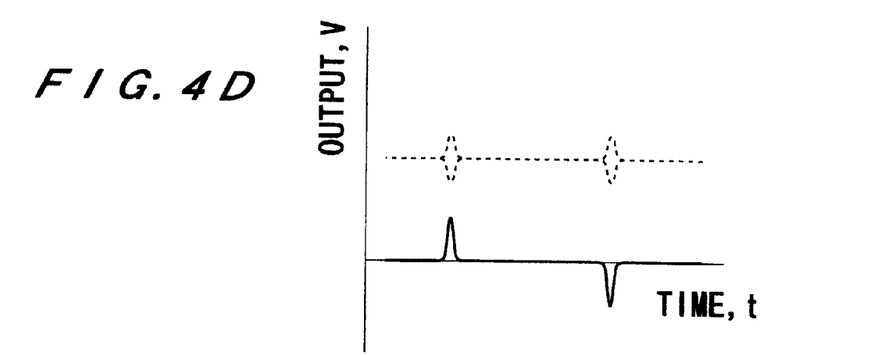
FIG. 4D a diagram showing a subtract output signal.

In the rotating speed signal extractor 42, both signal outputs of the displacement sensors 31, 32 are subjected to subtract processing. Therefore, as shown in FIG. 4D, the distance from the displacement sensor 31 to the plane 33 and the distance from the displacement sensor 32 to the plane 33 are subjected to subtract processing to give a value of zero, and, for the pulse outputs, signals of the concave and the convex are subjected to subtract processing. Therefore, as shown in FIG. 4D, a pulse output having 2-fold height is obtained. Therefore, for the signal output from the rotating speed signal extractor 42, only the rotating speed signal component with the displacement signal component being zero is extracted as a pulse signal.

The displacement signal extracted in the position displacement signal extractor 41 is passed through a displacement sensor signal processing circuit 23, a compensation circuit 24, and an exciting current amplifier 25, as described above in connection with the conventional signal processing circuit shown in FIG. 11, to regulate an exciting current of the axial electromagnet 15 which is then used in the control of the axial levitation position of the rotator. Likewise, the rotating speed signal extracted in the rotating speed signal extractor, as with the prior art technique, is passed through a rotation sensor signal processor 26, a rotating speed controller 27, and an inverter 28 and is used in the control of the rotating speed of the motor.

For the displacement signal output from the position displacement signal extractor 41 and the rotating speed signal output from the rotating speed signal extractor 42, the signal processing process after the output is the same as that in the conventional system. Specifically, the displacement signal is passed through the displacement sensor signal processor 23, the compensation circuit 24, and the exciting current amplifier 25 and is input into the axial electromagnet 15 to axially control levitation support of the rotator. That is, the signal detected in the position displacement signal extractor is subjected to predetermined signal processing in the displacement sensor signal processing circuit 23 within the control unit, and this signal is input into the phase compensation circuit 24 wherein phase compensation is carried out so as to stabilize the control system of the whole magnetic bearing system, followed by input into the exciting current output amplifier 25. The exciting current output amplifier supplies an exciting current to the electromagnet so as to generate electromagnetic force for supporting the rotator in a levitated state. The rotating speed signal is passed through the rotating sensor signal processor 26 and the rotating speed control unit 27, and is input into the inverter 28 to excite the motor, thereby controlling the rotating speed of the rotator.

According to the present invention, the detection mechanism for detecting the rotating speed and detecting the levitation position (displacement) of the rotator has been simplified so as to be constituted by two axial detection displacement sensors 31, 32, a displacement detection-rotating speed detection disk 30, and signal processing circuits 41, 42. Unlike the conventional system, this can eliminate the need to provide, on the fixed side of the magnetic bearing mechanism in a hierarchical structure manner, the axial position detection displacement sensor and the rotation speed detection sensor and target materials corresponding respectively to them. The detection disk 30 and the displacement sensors 31, 32 can be responsible for these functions. Therefore, the axial length on the fixed side of the magnetic bearing mechanism can be shortened, and, also for the rotator, the necessity of providing both the rotating speed detection disk and the axial position displacement sensor target can be eliminated. Therefore, the axial length of the rotator per se can also be shortened.

When the above method is used, regarding the concave and the convex provided in the detection disk 30, even in the case of the provision of only either the concave or the convex rather than the provision of a combination of the concave and the convex, the displacement signal and the rotating speed signal can be computed by changing the construction of the signal processing circuit.

Figure 5:
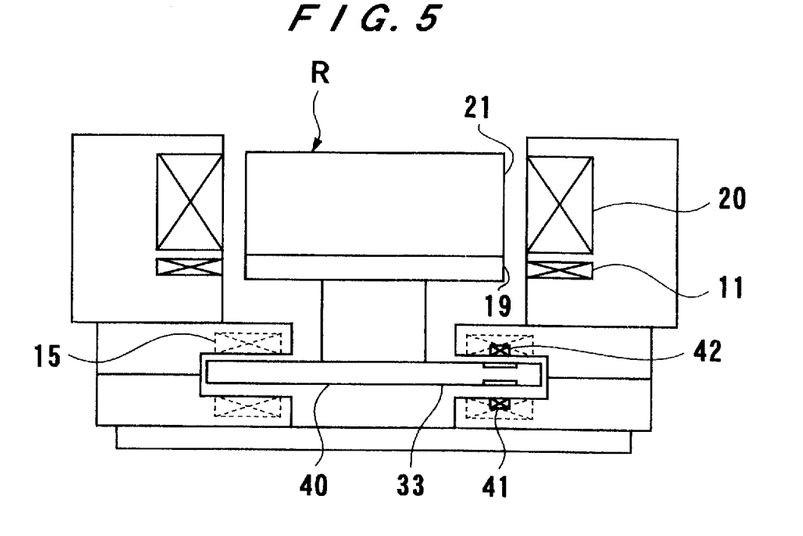
FIG. 5 is a cross-sectional view showing a magnetic bearing mechanism according to the second embodiment of the present invention.
Figure 6A:
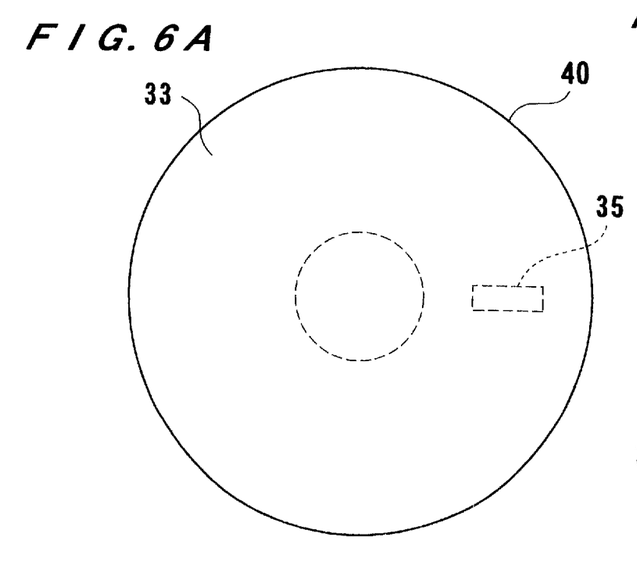
FIGS. 6A, 6B, and 6C are respectively a plan view, an elevational view, and a side view of a thrust disk in FIG. 5.
Figure 6B:
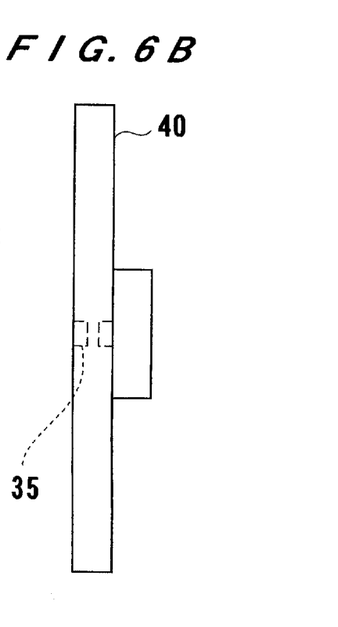
Figure 6C:
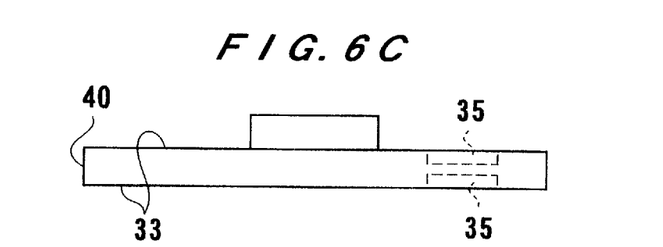

FIG. 5 is a diagram showing the magnetic bearing mechanism according to the second embodiment of the present invention. FIG. 6 is an enlarged view of a thrust disk 40 as the principal part of FIG. 5. In this embodiment, a plane 33 for detecting the axial displacement is provided in the thrust disk 40 formed of a magnetic material. Further, a concave 35 for forming a pulse output for rotating speed detection is provided in the plane 33 of the thrust disk 40. Axial detection displacement sensors 41, 42 are disposed symmetrically at the axial position corresponding to the concave 35. In the embodiment shown in the drawing, the concave is provided. Alternatively, a convex may be provided instead of the concave. According to the above embodiment, the displacement sensors 41, 42 are disposed within the axial electromagnet 15.

Figure 7:
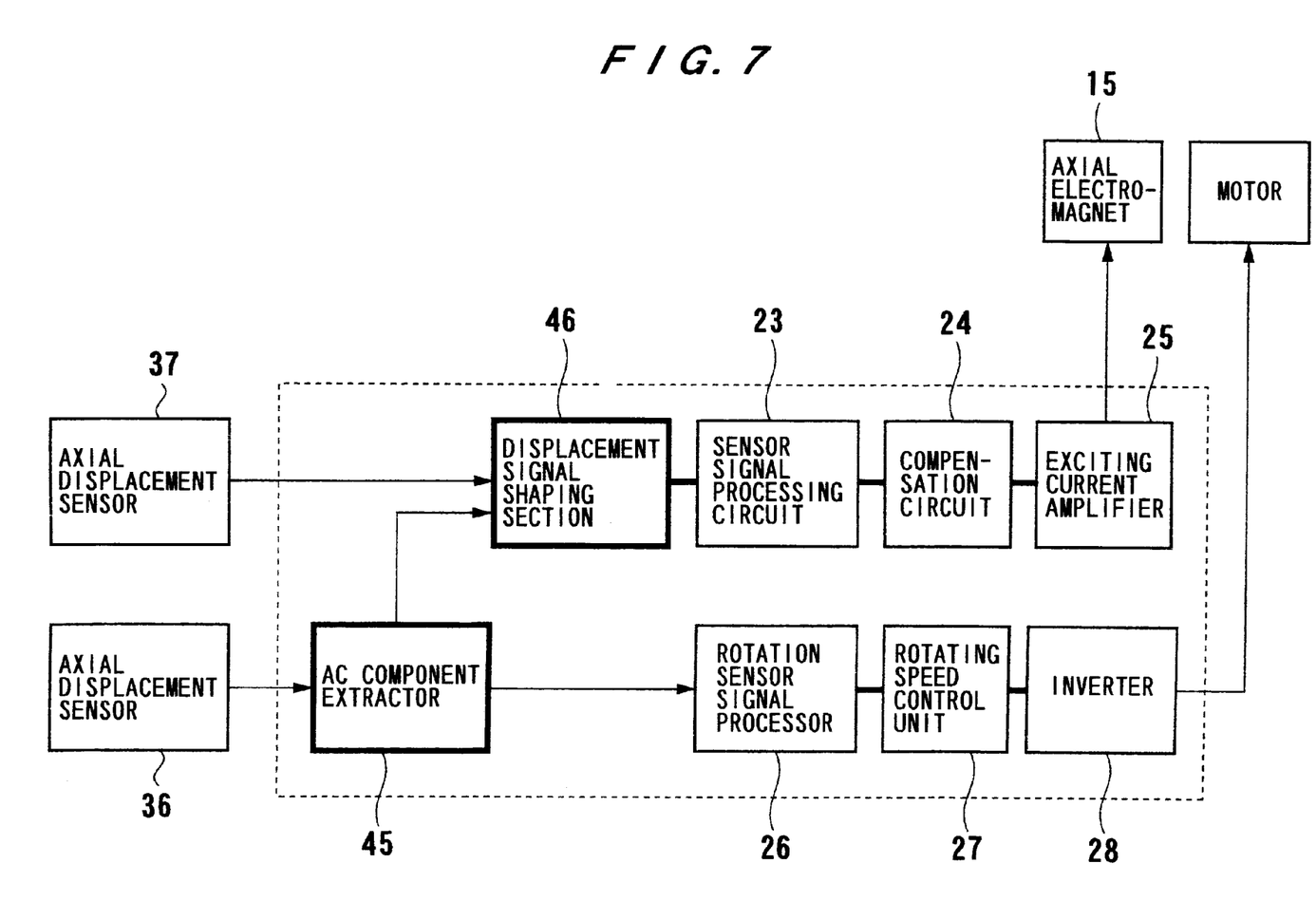
FIG. 7 is a block diagram of a control unit for axial displacement and rotating speed in the magnetic bearing mechanism in FIG. 5.

FIG. 7 is a diagram showing an embodiment of the construction of a control unit in the magnetic bearing mechanism shown in FIG. 5. For example, the output signal of one axial displacement sensor 36 is input into an AC (alternating current) component extractor 45. The AC component extractor 45 may be, for example, a filter for cutting off the DC (direct current) component. Therefore, the AC component is extracted from the displacement sensor output signal in the AC component extractor 45, and is added to the signal output from another axial displacement sensor 37 to offset the pulse signal component corresponding to the rotating speed, and only the displacement signal component is extracted in the displacement signal shaping section 46. As with the above embodiments, the position of levitation of the rotator in the axial direction is controlled by this signal. Likewise, the pulse signal corresponding to the rotating speed extracted in the AC component extractor 45 is passed through the rotating sensor signal processor 26, the rotating speed control unit 27, and the inverter 28 and is utilized for controlling the rotating speed of the motor.

Figure 8:
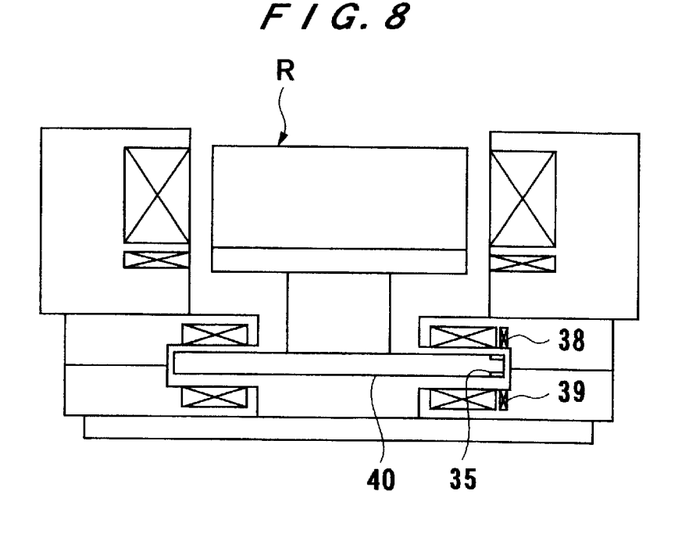
FIG. 8 is a diagram showing a variation of the magnetic bearing mechanism shown in FIG. 5.
Figure 9A:
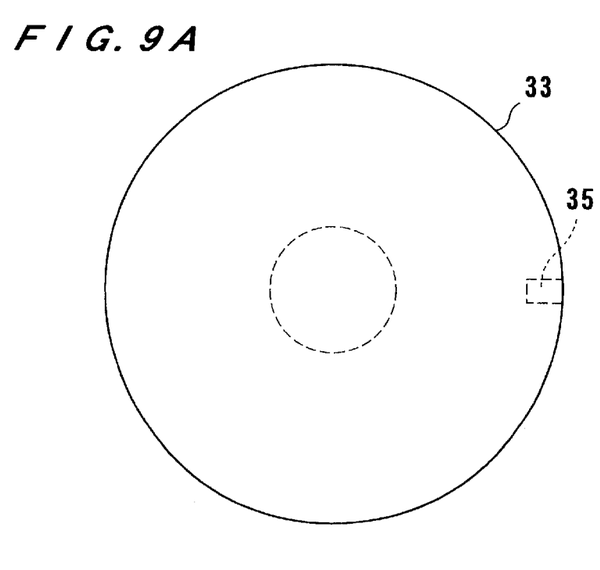
FIGS. 9A, 9B, and 9C are respectively a diagram showing the principal part of the thrust disk shown in FIG. 8.
Figure 9B:
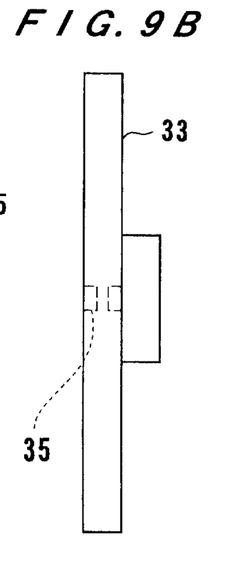
Figure 9C:
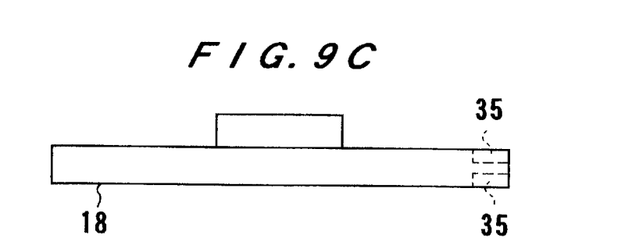

FIG. 8 is a diagram showing a variation of the magnetic bearing mechanism according to the second embodiment of the present invention, and FIG. 9 is an enlarged view of the principal part of the magnetic bearing mechanism shown in FIG. 8. According to this embodiment, as with the second embodiment, a plane 33 for detecting the axial displacement is provided in the thrust disk 42. Further, a notch (a concave) for detecting the rotating speed is disposed in the peripheral portion of the thrust disk. Because of the adoption of this construction, axial displacement sensors 38, 39 are disposed in the outside of the wound section of the axial electromagnet 15. The construction of the control unit, which receives the output of the displacement sensors 38, 39, is also the same as that shown in FIG. 7. In the embodiment shown in the drawing, a concave is provided. Alternatively, a convex may be provided instead of the concave. As with the above embodiments, the output of the displacement sensors 38, 39 permits the axial displacement of the rotator to be detected from the detection position of the plane 33 and permits a pulse signal corresponding to the rotating speed to be extracted from the concave 35.

In this embodiment wherein the axial displacement sensors 38, 39 are provided in the fixed portion on the shaft end side of the magnetic bearing mechanism and the plane 33 and the concave 35 are provided in the thrust disk 40, the displacement sensors 38, 39 output signals, obtained by simultaneous detection of the levitation position (displacement) and the rotating speed of the rotator, which are then processed in signal processing circuits provided within the control unit, whereby a position displacement signal and a rotating speed signal of the rotator can be extracted. The use of these signals in the control of the magnetic bearing apparatus can eliminate the need to provide the position detection disk. This can shorten the axial length of the magnetic bearing mechanism, and, in addition, this change in structure can reduce the number of components for constituting the magnetic bearing mechanism.

The above embodiments illustrate examples of the present invention, and, for the number of displacement sensors for axial position detection provided on the same plane and the number of concaves and convexes provided in the detection plane provided on the shaft end side of the rotator, various combinations are possible and it is needless to say that, even when the number of them has been change, the same effect as described above can be attained.

As described above, according to the present invention, the provision of a displacement sensor for position detection on the fixed side, the provision of a detection plane facing this sensor on the rotation side, and the provision of a concave and/or a convex provided in this plane can realize simultaneous measurement of both the displacement from the displacement sensor to the plane facing the sensor and the rotating speed of the rotator. Therefore, the structure of the magnetic bearing mechanism particularly in its shaft end can be simplified. This can reduce the number of components and can realize size reduction.

The present invention has been described in detail with particular reference to preferred embodiments thereof, but it will be understood that variations and modifications can be effected within the spirit and scope of the present invention.

What is claimed is:

1. A magnetic levitation rotating machine comprising:
   a rotator;
   an electromagnet or a permanent magnet supporting the rotator in a levitated state by a magnetic force of the electromagnet or the permanent magnet;
   the rotator comprising one or more than one position detection planar surfaces;
   a pair of displacements on the planar surfaces, the displacements comprising one concave and one convex;
   a pair of displacement sensors on a fixed part of the machine, the pair of displacement sensors corresponding to the pair of displacements and detecting the pair of displacements substantially simultaneously; and
   a detection mechanism combining signals from the pair of displacement sensors.

2. The magnetic levitation rotating machine according to claim 1, wherein the detection mechanism adds the signals to determine a position of the rotator and the detection mechanism subtracts the signals to determine a rotating speed of the rotator.

3. The magnetic levitation rotating machine according to claim 1, wherein convex and the concave are diametrically opposed across a rotation axis of the rotator.

4. A magnetic levitation rotating machine comprising:
   a rotator;
   an electromagnet or a permanent magnet supporting the rotator in a levitated state by a magnetic force of the electromagnet or the permanent magnet;
   the rotator comprising a position detection planar surface further comprising a concave and/or a convex provided in the planar surface;

a displacement sensor on a fixed part of the machine, to detect a displacement of the planar surface including the concave or the convex; and a detection mechanism detecting the displacement of the rotator and a rotating speed of the rotator from an output of the displacement sensor;

wherein the displacement of the rotator is detected by excavating, from the output of the displacement sensor, the displacement of the planar surface with the component representing the concave or the convex being removed therefrom.

5. A magnetic levitation rotating machine comprising:

a rotator;

an electromagnet or a permanent magnet supporting the rotator in a levitated state by a magnetic force of the electromagnet or the permanent magnet;

the rotator comprising a position detection planar surface further comprising a concave and/or a convex provided in the planar surface;

a displacement sensor on a fixed part of the machine, to detect a displacement of the planar surface including the concave or the convex; and a detection mechanism detecting the displacement of the rotator and a rotating speed of the rotator from an output of the displacement sensor;

wherein at least one pair of the displacement sensors is disposed at an arbitrary angle to the center of rotation of the rotator;

the detection planar surface is disposed so as to face the displacement sensors;

the concave and/or the convex is disposed so as to correspond to the positions of the displacement sensor at the arbitrary angle to the center of rotation of the rotator; and the position displacement and rotation speed of the detection planar surface are computed from the outputs of the at least one pair of the displacement sensors and are output to detect the displacement of the rotator and the rotating speed of the rotator.

6. The magnetic levitation rotating machine according to claim 5, wherein the rotating speed of the rotator is detected by extracting, from the output of the displacement sensor, pulse output corresponding to the concave or the convex.

7. A magnetic levitation rotating machine comprising:

a rotator;

an electromagnet or a permanent magnet supporting the rotator in a levitated state by a magnetic force of the electromagnet or the permanent magnet;

the rotator comprising a position detection planar surface further comprising a concave and/or a convex provided in the planar surface;

a displacement sensor on a fixed part of the machine, to detect a displacement of the planar surface including the concave or the convex; and a detection mechanism detecting the displacement of the rotator and a rotating speed of the rotator from an output of the displacement sensor;

wherein the detection planar surface of the rotator is comprised of a thrust disk formed of a magnetic material, which is an object to be controlled by an electromagnet for axial levitation position control.

8. The magnetic levitation rotating machine according to claim 7, wherein the displacement sensors are each disposed within the axial electromagnet.

9. The magnetic levitation rotating machine according to claim 7, wherein the displacement sensors are each disposed in outside of the axial electromagnet.

* * * * *

UNITED STATES PATENT AND TRADEMARK OFFICE
CERTIFICATE OF CORRECTION

PATENT NO. : 6,617,722 B2
DATED : September 9, 2003
INVENTOR(S) : Ooyama et al.

It is certified that error appears in the above-identified patent and that said Letters Patent is hereby corrected as shown below:

Column 9,
Line 8, delete "excavating" and insert -- extracting --.
Line 34, delete "sensor" and insert -- sensors --.

Column 10,
Line 1, delete "rotation" and insert -- rotating --.
Line 9, insert -- a -- before "pulse".
Line 34, delete "in" before "outside".

Signed and Sealed this

Third Day of February, 2004

JON W. DUDAS
*Acting Director of the United States Patent and Trademark Office*